United States Patent
Lang

[11] 3,768,022
[45] Oct. 23, 1973

[54] APPARATUS FOR GENERATING PHASE MODULATED ELECTRICAL SIGNALS IN RESPONSE TO A MEASURED ANGULAR OR LINEAR DISPLACEMENT

[75] Inventor: Karl Lang, Atzbach, Germany

[73] Assignee: Ernst Leitz GmbH, Wetzlar, Germany

[22] Filed: Dec. 4, 1972

[21] Appl. No.: 311,775

[30] Foreign Application Priority Data
Dec. 8, 1971 Germany .................. P 21 60 880.0

[52] U.S. Cl. .................... 328/39, 325/163, 328/155, 328/133, 328/55
[51] Int. Cl. ......................................... H03k 21/00
[58] Field of Search .................. 328/34, 39, 55, 24, 328/25, 133, 155; 324/83; 307/295; 325/163; 332/9, 16; 178/66

[56] References Cited
UNITED STATES PATENTS
3,553,368  1/1971  Rudolph ............................ 325/163
3,131,363  4/1964  Landee .............................. 325/163
3,713,017  1/1973  Vena .................................. 325/163
3,325,721  6/1967  Clark ................................ 332/16 R
3,546,603  12/1970 Lenz .................................. 328/155
3,271,688  9/1966  Gschwind .......................... 328/155
3,675,139  7/1972  Guest ................................ 329/112
3,659,202  4/1972  Kaneko ............................. 325/163
3,624,526  11/1971 Silverman .......................... 328/55

Primary Examiner—John W. Huckert
Assistant Examiner—R. E. Hart
Attorney—Gilbert L. Wells

[57] ABSTRACT

The digital output signals of an incremental path or angle measuring system are converted into phase modulated electrical signals by conducting the phase-shifted output signals via a gating circuit to the first input means of gates of which the second input means are supplied with the pulses of a generator which are phase-shifted relative to one another by a fixed degree. The signals derived from the output means of the gates are supplied to a frequency divider means and the output signals thereof represent in combination with in-phase pulses derived directly from the generator the desired phase-modulated signals.

7 Claims, 3 Drawing Figures

3,768,022

APPARATUS FOR GENERATING PHASE MODULATED ELECTRICAL SIGNALS IN RESPONSE TO A MEASURED ANGULAR OR LINEAR DISPLACEMENT

BACKGROUND OF THE INVENTION

The present invention relates to apparatus for converting digital output signals of an incremental path or angle measuring system into phase modulated electrical signals.

Path measuring systems which, in order to indicate displacement of an object, provide a pair of electrical signals which have been phase-shifted relative to one another in proportion to a measured displacement are known. In these systems, the magnitude of the measured displacement is translated into a proportional relative phase displacement by, for example, inductive or optical means. A displacement corresponding to a phase displacement of 360° represents, in general, a large displacement of the object relative to the range of displacement to be measured by the apparatus. To employ such apparatus to measure small displacements with a high degree of accuracy gives rise to appreciable difficulties in respect of phase stability. Counterbalancing this limitation of such phase-modulated techniques is the advantage that the signals provided may be stored easily and that the processing of such signals is relatively free from difficulties arising from the generation in neighbouring apparatus of extraneous electrical signals of the kind which might cause interference with apparatus for processing amplitude modulated electrical signals.

Also known are incremental measuring systems in which digital signals of very great resolution are generated. Such systems provide the accuracy needed in fine measuring techniques, however, they suffer from the disadvantage that their output signals, if they are to be protected from interference by extraneous electrical signals, can only be stored and processed in highly complex and, therefore, very expensive equipment.

It is therefore an object of the invention to provide an apparatus which overcomes these disadvantages.

SUMMARY OF THE INVENTION

The above stated object is attained by an apparatus comprising means for deriving a plurality of gating signals from a pair of regularly repetitive input signals which are relatively phase-shifted to represent a measured linear or angular displacement, a source of regularly repetitive electrical signals connected via a phase-shift network to provide a plurality of electrical signals which are phase-shifted relative to one another, a plurality of gates each having input means to which is applied a respective one of the electrical signals provided by the phase-shift network, first and second frequency divider means having equal frequency divider ratios, a signal derived from the signal source being applied to input means of the first frequency divider means and a signal derived from output means of the gating means being applied to input means of the second frequency divider means, the gates being rendered selectively conductive by the gating signals to provide a signal at the output means of the second frequency divider means which is phase-related to a signal at the output means of the first frequency divider means to represent the measured quantity.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
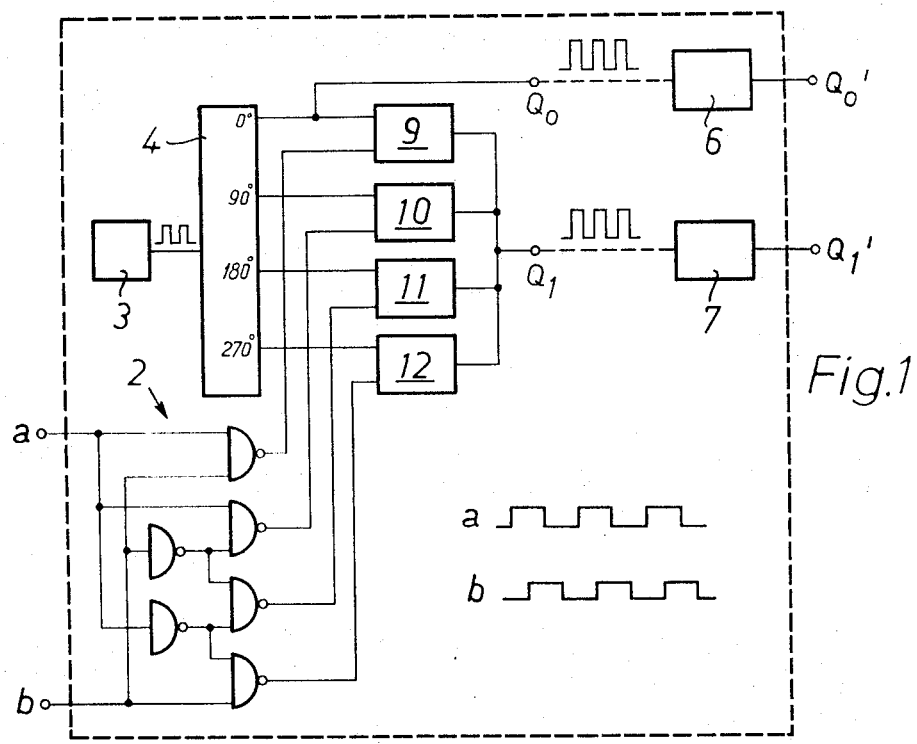
FIG. 1 shows a block schematic diagram of apparatus embodying the invention.

Referring now to the drawings, in FIG. 1 a pair of electrical signals derived from a static transmitter (not shown) and which are to be converted into phase-modulated output signals, are designated by the reference symbols a and b. These signals a and b are applied to an input gating circuit indicated generally by the reference numeral 2, the four output signals of which control gates 9 to 12. Applied to these gates are four different electrical alternating signals of high pulse repetition frequency. These four signals are phase-displaced relative to one another by 90° and are derived from outputs of a phase-shift network 4 connected to the output of a pulse generator 3. The four output signals derived from the respective gates 9 to 12 are all connected together at one terminal $Q_1$. Thus, the respective output signals derived from the gates 9 to 12 are added together and then applied to a frequency divider and counter unit 7. The high frequency electrical alternating signal with the phase displacement 0° derived from the phase-shift network 4 is applied via a terminal $Q_0$ to a second frequency divider and counter unit 6, so that at output means $Q'_0$ and $Q'_1$ of the units 6 and 7, a phase-modulated pair of signals is provided.

The signals a and b derived from the static transmitter (not shown) on linear or angular displacement of the object to be measured are phase-shifted relative to one another in dependence on the magnitude of that displacement. Consequently, a comparison between the wave forms of the signals a and b provide the combinations: on-on, off-on, off-off, on-off for each complete comparison cycle. Each of these combinations renders one and only one of the gate stages 9 to 12 conductive. By contrast to the signals a and b, which do not change their phase relationship, the phase relationship between the pair of analogue output signals $Q'_0$ and $Q'_1$, changes abruptly on a transition of the digital input signals a and b from one of the above mentioned combinations to the next by a small amount determined by the scaling down effected by the units 6 and 7 and on the frequency of the generator. These discrete changes in phase cannot, in general, be immediately recognised in the lower frequency signals $Q'_0$ and $Q'_1$, but only first then, when for example the polarity change of $Q'_1$ ensues earlier or later than is to be expected according to the unmodulated duration of the period of $Q'_1$. Since additional pulses at the terminals $Q'_1$ originating in the switching over from the one gate to the next would tend to produce counting errors, care must be taken that this switching over takes place only in phase with the normal transition of the pulsed wave form.

Figure 2:
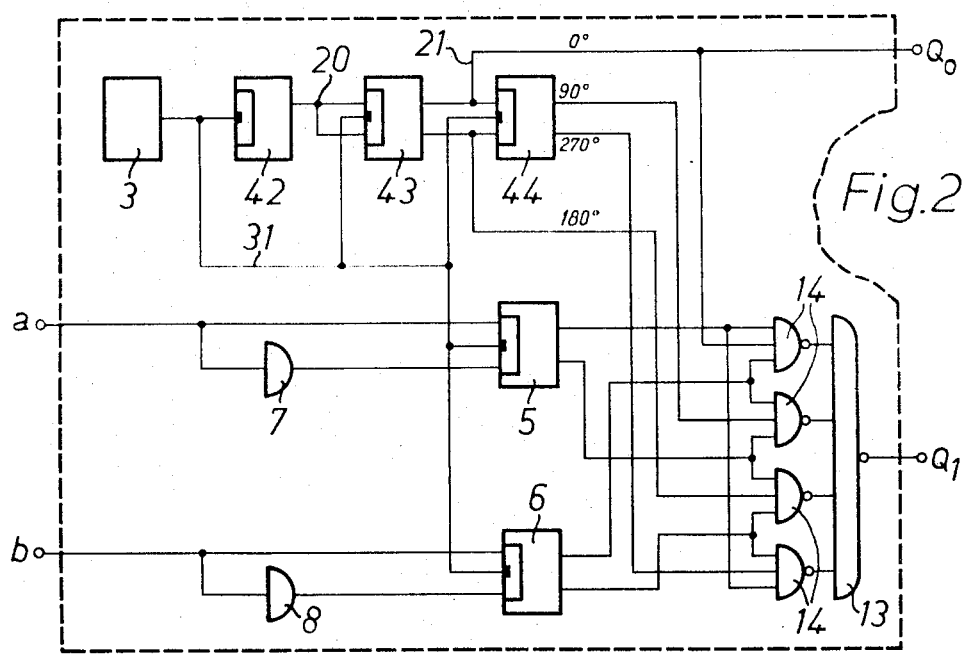
FIG. 2 shows a further and more detailed block schematic diagram of apparatus embodying the invention.

An arrangement for synchronous change-overs of this kind is represented in detail in FIG. 2 by logic switching elements. Bi-stable devices designated by the reference symbols 42, 43 and 44 in FIG. 2 together corresond to the phase-shift network 4 in FIG. 1. Further bi-stable devices 5 and 6, together with inverters 7 and 8, correspond substantially to the input gating circuit 2 in FIG. 1, and NAND-gates 14 in FIG. 2 correspond to the gates 9 and 12 in FIG. 1. As shown in FIG. 2, the NAND-gates 14 are connected together via a further NAND-gate 13 to output means $Q_1$. The phase-related signals $a$ and $b$ are applied together with the anti-phases generated by the inverters 7 and 8 to the preparatory inputs of the further bi-stable devices 5 and 6. A change of the polarity (phase transition) of the phase-related signals $a$ and $b$ is effective only on the application of the subsequent leading edge of a pulse from the pulse generator 3 at the pulse inputs of the bi-stable devices 5 and 6. The output signals provided by the bi-stable devices 5 and 6 then remain in the states thus created, independently of the application of further edges of high repetition frequency pulses until the next phase transition of the signals $a$ and $b$.

The bi-stable devices 42, 43 and 44, apart from providing relatively phase-shifted pulse trains derived from the train of clock pulses of high pulse repetition frequency generated by the generator 3, also effect synchronous fourfold frequency dividing. As in the case of the bi-stable devices 5 and 6, the pulse inputs of 42, 43 and 44 are also acted upon by the clock pulses from the generator 3 applied via a line 31. The device 42 therefore tilts on each negative-going edge of the pulse wave form. The device 43 by contrast tilts, as a bi-stable blocked by the output signal of the device 42, only on each second negative-going edge of the pulse wave form, so that at the output means $Q_o$ there is present a pulse signal which is synchronous with the output pulses from the generator 3 and which has a pulse repetition rate of one quarter of that of the output from the generator 3. The device 44 operates as one stage of a shift register, and at the output of the device 44 there is provided signals which are displaced in phase relative to their input by 90° and 270°, respectively, since at the input are provided signals of phase 0° and 180°, which are derived from the anti-phase outputs of the device 43.

Figure 3:
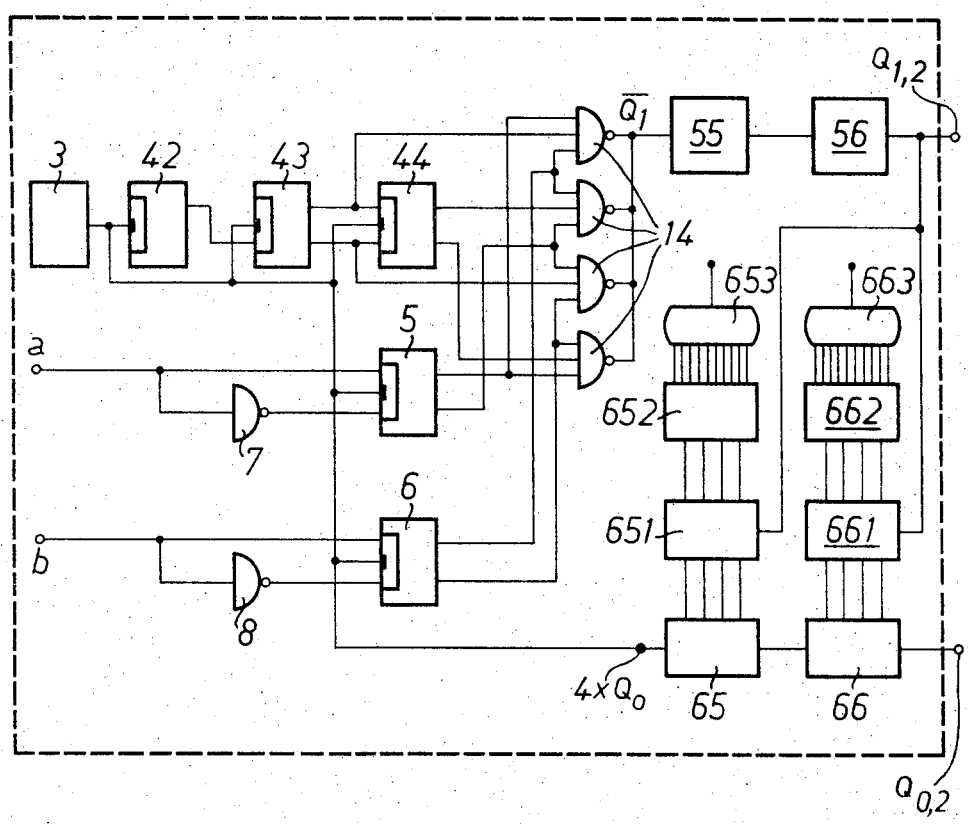
FIG. 3 shows yet another block schematic diagram of apparatus embodying the invention and including a forward and reverse counter with numerical indication.

The gates 14 are controlled by signals derived from bi-stable devices 5 and 6 and applied to first input means of each of the respective gates 14. As indicated in FIG. 2, the pulse trains which are phase-related by 0°, 90°, 180° and 270° to a reference pulse train are applied to second inputs of the gates 14, respectively. The arrangement thus described by way of example is again shown in FIG. 3, complemented by a complete forward and reverse counter with numeral indication. Instead of $Q_o$ (FIG. 2), the signal $4 \times Q_o$ (i.e., a signal fourfold greater in frequency than $Q_o$) is employed as a reference signal. Accordingly, the phase-modulated signal $Q_1$ is scaled down in frequency 25-fold via both Mod-5-counters 55 and 56, and the signal $4 \times Q_o$ is scaled down in frequency a 100-fold via both counting decades 65 and 66 in order to have comparable signals in $Q_{o,2}$ and $Q_{1,2}$. The counters 65 and 66 count the frequency of $4 \times Q_o$, the counting states being taken over from both 4×-receiving bi-stable devices 651 and 661 in "BCD"-code at points in time determined by collecting pulses $Q_{1,2}$, translated into "1-out of 10" code in decoders 652 and 662 and indicated by indicator tubes 653 and 663.

What is claimed is:

1. Apparatus converting digital output signals of an incremental path or angle measuring system into phase-modulated electrical signals comprising:
    a. means for deriving a plurality of gating signals from a pair of regularly repetitive input signals which are relatively phase-shifted to represent a measured linear or angular displacement;
    b. a source of regularly repetitive electrical signals connected via a phase-shift network to provide a plurality of electrical signals which are phase-shifted relative to one another;
    c. a plurality of gates each having input means to which is applied a respective one of the electrical signals provided by the phase-shift network;
    d. first and second frequency divider means having equal frequency divider ratios; a signal derived from the signal source being applied to input means of the first frequency divider means and a signal derived from output means of the gating means being applied to input means of the second frequency divider means, the gates being rendered selectively conductive by the gating signals to provide a signal at the output means of the second frequency divider means which is phase-related to a signal at the output means of the first frequency divider means to represent the measured quantity.

2. Apparatus as claimed in claim 1, comprising waveform shaping means to render the waveform of each of the input signals substantially rectangular prior to the input signals being applied to the deriving means.

3. Apparatus as claimed in claim 1, wherein the plurality of electrical signals derived from the phase-shift network comprise four electrical signals which are successively phase-displaced through 90° relative to one another.

4. Apparatus as claimed in claim 1, wherein the phase-shift network comprises a plurality of serially connected bi-stable devices.

5. Apparatus as claimed in claim 1, wherein the gating signal deriving means comprises a pair of bi-stable devices, to respective input means of which the input signals of the pair of relatively phase-shifted input signals are applied and from the output means of which pair of bi-stable devices the gating signals are derived.

6. Apparatus as claimed in claim 5, wherein each of the bi-stable devices is provided with two input means, to a first of which a respective one of the input signals is applied directly and to a second of which the respective input signal is applied via signal inverter means.

7. Apparatus as claimed in claim 1, comprising reversible counter means connected to the output means of the first and second frequency divider means to provide a numerical indication of the measured quantity.

* * * * *